US008351657B2

United States Patent
Makela et al.

(10) Patent No.: US 8,351,657 B2
(45) Date of Patent: Jan. 8, 2013

(54) METHOD FOR THE VIEWING OF VISUAL INFORMATION WITH AN ELECTRONIC DEVICE

(75) Inventors: Kaj Makela, Helsinki (FI); Jukka Nurminen, Espoo (FI); Olli Immonen, Helsinki (FI); Petteri Saarinen, Helsinki (FI); Panu Vartiainen, Asikkala (FI)

(73) Assignee: Nokia Corporation, Espoo (FI)

( * ) Notice: Subject to any disclaimer, the term of this patent is extended or adjusted under 35 U.S.C. 154(b) by 1400 days.

(21) Appl. No.: 12/000,160

(22) Filed: Dec. 10, 2007

(65) Prior Publication Data

US 2008/0181464 A1 Jul. 31, 2008

Related U.S. Application Data

(60) Provisional application No. 60/877,618, filed on Dec. 29, 2006.

(51) Int. Cl.
*G06K 9/00* (2006.01)
*G06K 9/36* (2006.01)

(52) U.S. Cl. ........ 382/113; 382/100; 382/103; 382/147; 382/151; 382/287

(58) Field of Classification Search .................. None
See application file for complete search history.

(56) References Cited

U.S. PATENT DOCUMENTS

| 4,827,330 | A  | * | 5/1989  | Walsh et al. ............... 358/452 |
| 5,020,122 | A  | * | 5/1991  | Walsh et al. ............... 382/236 |
| 6,078,701 | A  | * | 6/2000  | Hsu et al. .................. 382/294 |
| 6,205,239 | B1 | * | 3/2001  | Lin et al. ................... 382/149 |
| 6,246,417 | B1 | * | 6/2001  | Kambe et al. .............. 345/619 |
| 6,950,535 | B2 | * | 9/2005  | Sibayama et al. .......... 382/113 |
| 7,027,653 | B2 | * | 4/2006  | Hino et al. ................. 382/218 |
| 7,598,490 | B2 | * | 10/2009 | Kurihara et al. ........... 250/307 |
| 7,756,300 | B2 | * | 7/2010  | Jung et al. ................. 382/113 |
| 2006/0133648 | A1 | * | 6/2006 | Meunier et al. ............ 382/103 |

* cited by examiner

*Primary Examiner* — Tom Y Lu
*Assistant Examiner* — Thomas Conway
(74) *Attorney, Agent, or Firm* — Ditthavong Mori & Steiner, P.C.

(57) ABSTRACT

The invention relates to a method, which comprises the capturing of image data representing a physical object using an electronic device. First visual objects are determined in the image data. Second objects are determined among the first visual objects. Position information is determined for the second visual objects within the physical object. Third visual object are obtained based on the position information from object data storage. The third visual objects are matched to the first visual objects and differences between third visual objects and the first visual object are indicated to a user.

18 Claims, 6 Drawing Sheets

US 8,351,657 B2

METHOD FOR THE VIEWING OF VISUAL INFORMATION WITH AN ELECTRONIC DEVICE

CROSS-REFERENCE TO RELATED APPLICATIONS

This application claims priority of U.S. Provisional Patent Application Ser. No. 60/877,618, filed Dec. 29, 2006. The subject matter of this earlier filed application is hereby incorporated by reference.

BACKGROUND OF THE INVENTION

1. Field of the Invention

The invention relates to digital imaging. Particularly, the invention relates to a method for the viewing of visual information with an electronic device.

2. Description of the Related Art

The term blueprints refers to the plans for the guiding of many processes such as building constructions, product manufacture, machine construction, shipbuilding, electrical installations, pipelining and gardening, for example. Blueprints may also even refer to drawings and illustrations used in software design, project management and organization planning. Nowadays, the blueprints are predominantly produced using Computer Assisted Design (CAD) software. However, sometimes they may be still drawn manually, especially in more artistic designs. The blueprints are mostly printed on large ISO 216 A0-A3 sized sheets. The roughly corresponding sizes in the ANSI standards are B-E. The blueprints are used in the sharing of building information for builders, master builders and construction engineers. The blueprints are maintained by a construction designer. As changes occur during the course of the construction, they are made known to the construction designer who updates the blueprints. The updated blueprints are printed, sometimes by an external subcontractor, and delivered to the construction site or to any other place where they are needed. The blueprints are often annotated with version numbers. On a construction yard there is maintained a list of valid blueprints. The validity of a blueprint may be checked by comparing the version number of a specific blueprint to a version number associated with the identifier of the blueprint on the list.

The problem with the paper blueprints is that as the plans change, the blueprint becomes outdated. This may happen very frequently since any change in a minor detail renders the blueprints obsolete. Sometimes the construction staff makes on-site notes and changes to the blueprints reflecting calculations and ad hoc design solutions. As new versions of the blueprints are provided, such notes and changes may be lost, unless they are made known to the construction designer early enough. The printing cycle of blueprints may be, for example, up to a week, so there is a potential risk of using invalid blueprints. Similar problems may be found in any sharing of frequently changing visually communicated information, which consists of a lot of detail.

Recently, mobile communication devices equipped with digital cameras make it possible to capture images or video even from documents.

It would be beneficial to be able to have a solution which enables the verification of blueprints using a mobile communication device and a digital camera.

SUMMARY OF THE INVENTION

The invention relates to a method comprising: capturing image data of a physical entity using an electronic device; determining at least one first visual object in the image data; determining at least one second visual object among said at least one first visual object; determining at least one first position for at least one second visual object within said physical entity; determining at least one second position based on said at least one first position; obtaining at least one third visual object based on said at least one second position from an object data storage; matching the at least one third visual object with the at least one first visual object; and indicating differences between said at least one third visual object and said at least one first visual object to a user.

The invention relates also to an electronic device comprising: a camera configured to capture image data of a physical entity; a processor configured to determine at least one first visual object in the image data, to determine at least one second visual object among said at least one first visual object, to determine at least one first position for at least one second visual object within said physical entity, to determine at least one second position based on said at least one first position, to obtain at least one third visual object based on said at least one second position from an object data storage, to match the at least one third visual object with the at least one first visual object, to produce information for indicating differences between said at least one third visual object and said at least one first visual object; and a display.

The invention relates also to an electronic device comprising: an electronic device comprising: means for determining at least one first visual object in the image data; means for determining at least one second visual object among said at least one first visual object; means for determining at least one first position for at least one second visual object within said physical entity; means for determining at least one second position based on said at least one first position; means for obtaining at least one third visual object based on said at least one second position from an object data storage; means for matching the at least one third visual object with the at least one first visual object; and means for producing information for indicating differences between said at least one third visual object and said at least one first visual object.

The invention relates also to a network node comprising: a communication entity configured to receive image data of a physical entity and to transmit augmented visual data; and a visual data processing entity configured to determine at least one first visual object in the image data, to determine at least one second visual object among said at least one first visual object, to determine position information for said at least one second visual object within said physical entity, to determine second position information based on said position information, to obtain at least one third visual object based on said second position information from an object data storage, to match the at least one third visual object with the at least one first visual object and to produce augmented visual data indicating differences between said at least one third visual object and said at least one first visual object to a user.

The invention relates also to a network node comprising: means for receiving image data of a physical entity and to transmit augmented visual data; means for determining at least one first visual object in the image data; means for determining at least one second visual object among said at least one first visual object; means for determining position information for said at least one second visual object within said physical entity; means for determining second position information based on said position information; means for obtaining at least one third visual object based on said second position information from an object data storage; means for matching the at least one third visual object with the at least one first visual object; and means for producing augmented visual data indicating differences between said at least one third visual object and said at least one first visual object to a user.

The invention relates also to a computer program product comprising code adapted to perform the following steps when executed on a data-processing system: obtaining image data of a physical entity; determining at least one first visual object in the image data; determining at least one second visual object among said at least one first visual object; determining at least one first position for at least one second visual object within said physical entity; determining at least one second position based on said at least one first position; obtaining at least one third visual object based on said at least one second position from an object data storage; matching the at least one third visual object with the at least one first visual object; and indicating differences between said at least one third visual object and said at least one first visual object to a user.

In one embodiment of the invention, an image processing entity in the electronic device is configured to determine the position of the at least one second visual object in a coordinate system of the physical entity by inspecting the position information encoded in the at least one second visual object. Further, the image processing entity is configured to know the identities of second visual objects visible on the screen of the electronic device. The image processing entity is also configured with knowledge of the mutual distances of second visual objects. Finally, the image processing entity is configured to transform the coordinate system on the physical entity to the coordinate system of the camera. Hence, the image processing entity is able to know the positions of the first visual objects in terms of the pixel coordinates of the camera. In one embodiment of the invention, such coordinate transformation is performed to the highest reasonable resolution. This resolution is shared by the electronic device and the object data storage.

In one embodiment of the invention, the at least one third visual object is obtained from the object data storage using position information in camera coordinates. In one embodiment of the invention, the position information for third visual objects is transformed in the image processing entity to a dense coordinate format, which is denser than the resolution in any available device.

In one embodiment of the invention, the image processing entity is configured to use camera coordinates to match the at least one third visual object to the at least one first visual object. However, first the image processing entity transforms the coordinates used in the object data storage to the coordinates used to locate the first visual objects.

In one embodiment of the invention, coordinates on the physical entity are used for the obtaining of third visual objects and the matching in order to provide portability across devices of different resolutions.

In one embodiment of the invention, a server node within a communication network is configured to store the object data storage, to obtain position information and to provide object information in response to the position information. The server node is configured to communicate with the electronic device.

In one embodiment of the invention, the object data storage is stored in the electronic device. The object data storage may be stored, for example, within a primary or secondary memory of the electronic device.

In one embodiment of the invention, an image processing entity stored at least partly in the memory of the electronic device and executed by the processor obtains image data from the camera. The image processing entity is configured to determine at least one change to the physical entity. The position of the at least one change is determined, for example, using a coordinate system first established using the at least one second visual object. From the positions of the at least one second visual object it is possible to determine the edges of the images and thus the coordinates of the first visual objects on the physical object and on the image. The image processing entity is configured to determine at least one fourth visual object based on the at least one change and to provide said at least one fourth visual object to said object data storage.

In one embodiment of the invention, the image processing entity stored at least partly in the memory of the electronic device and executed by the processor determines first at least one fixed origin using the position information of said at least one second visual object. Thereupon, it uses the at least one fixed origin to determine the position information for said at least one first visual object and matches the position information of at least one third visual object with the position information of the at least one first visual object to determine if the first visual object and the third visual object represent same visual object.

In one embodiment of the invention, the image processing entity stored at least partly in the memory of the electronic device and executed by the processor is configured to determine position for said at least one first visual object using said at least one second position and to match the position of one of said at least one third visual object with the position of one of said at least one first visual object to determine if the first visual object and the third visual object represent same visual object.

In one embodiment of the invention, the image processing entity stored at least partly in the memory of the electronic device and executed by the processor is configured to decode visual information associated with the at least one second visual object in order to obtain the position of the visual object in relation to the boundaries of the physical entity. In one embodiment of the invention, the visual information associated with a second visual object is spatially close to the second visual object. In one embodiment of the invention, the visual information providing the position information of a second visual object may, for example, be a barcode or printed digits.

In one embodiment of the invention, the image processing entity stored at least partly in the memory of the electronic device and executed by the processor is configured to determine the position information from the visual appearance of the visual object. The visual appearance may, for example, be the shape of the visual object, the color of the visual object, the color distribution of the visual object or the texture of the visual object or any combination of them.

In one embodiment of the invention, said physical entity comprises a blueprint sheet.

In one embodiment of the invention, the physical entity comprises a machine, a device, one side of a machine or a device, a control panel for a system or a device, an electrical installation or an assembly.

In one embodiment of the invention, the electronic device comprises a mobile communication device, which may be a cellular telephone or a wireless local area network terminal.

In one embodiment of the invention, the electronic device comprises a digital camera. The digital camera may be connected to a mobile communication device.

In one embodiment of the invention, the image processing entity stored at least partly in the memory of the electronic device and executed by the processor is configured to process a photograph or at least one video stream as image data.

In one embodiment of the invention, said mobile communication device is a mobile station in a mobile communication system, for example, in a cellular mobile communication system. In one embodiment of the invention, the mobile communication system comprises at least one of a Global System of Mobile Communications (GSM) network and a Universal Mobile Telephone System (UMTS) network, a Code Division Multiple Access (CDMA) network or any other cellular network. In one embodiment of the invention, the system comprises, for example, a Wireless Local Area Network (WLAN) or a Worldwide Interoperability for Microwave Access (Wi-MAX) network. In one embodiment of the invention, the mobile communication device may be, for example, a GSM mobile station, CDMA mobile station or a UMTS mobile station with a dual mode or multimode functionality to support different access types. However, the different networks and systems mentioned are just examples. The invention may be used in any relevant data system, as those familiar to the state of the art may easily understand.

In one embodiment of the invention, the computer program product is stored on a computer readable medium. The computer readable medium may be a removable memory card, magnetic disk, holographic memory, optical disk or magnetic tape.

In one embodiment of the invention, the image processing entity allows the display of augmented metadata of objects on the screen of a mobile device. In the case of blueprints this entails that a user on the construction site may point the mobile device on a part of the blueprints, for example, a specific object. The user can see on the screen, for example, several data as augmented information. For example, the user may see the dimensions of the object, for example, in case of a piece of wall. There is no need to manually measure a length with a ruler from the blueprints while being on the field. The measures can be derived from the CAD system. Pertaining to elements there is maintained a log of changes, which provides information on the date and time of the last edition, identity of the editor and origin of the change request.

In one embodiment of the invention, a document, that is, a blueprint sheet is labeled with information that identifies it uniquely. In fact, document identifiers can be embedded in the visually encoded information, so that once the camera is pointed to the document, the identifier of the blueprint sheet and the location, that is, coordinates where the camera is pointed can be determined.

The embodiments of the invention described hereinbefore may be used in any combination with each other. Several of the embodiments may be combined together to form a further embodiment of the invention. A method, an electronic device, a network node or a computer program product to which the invention is related may comprise at least one of the embodiments of the invention described hereinbefore.

The benefits of the invention are related to improvements in the sharing of visual information using an electronic device and ease of recognizing changes in visual information.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
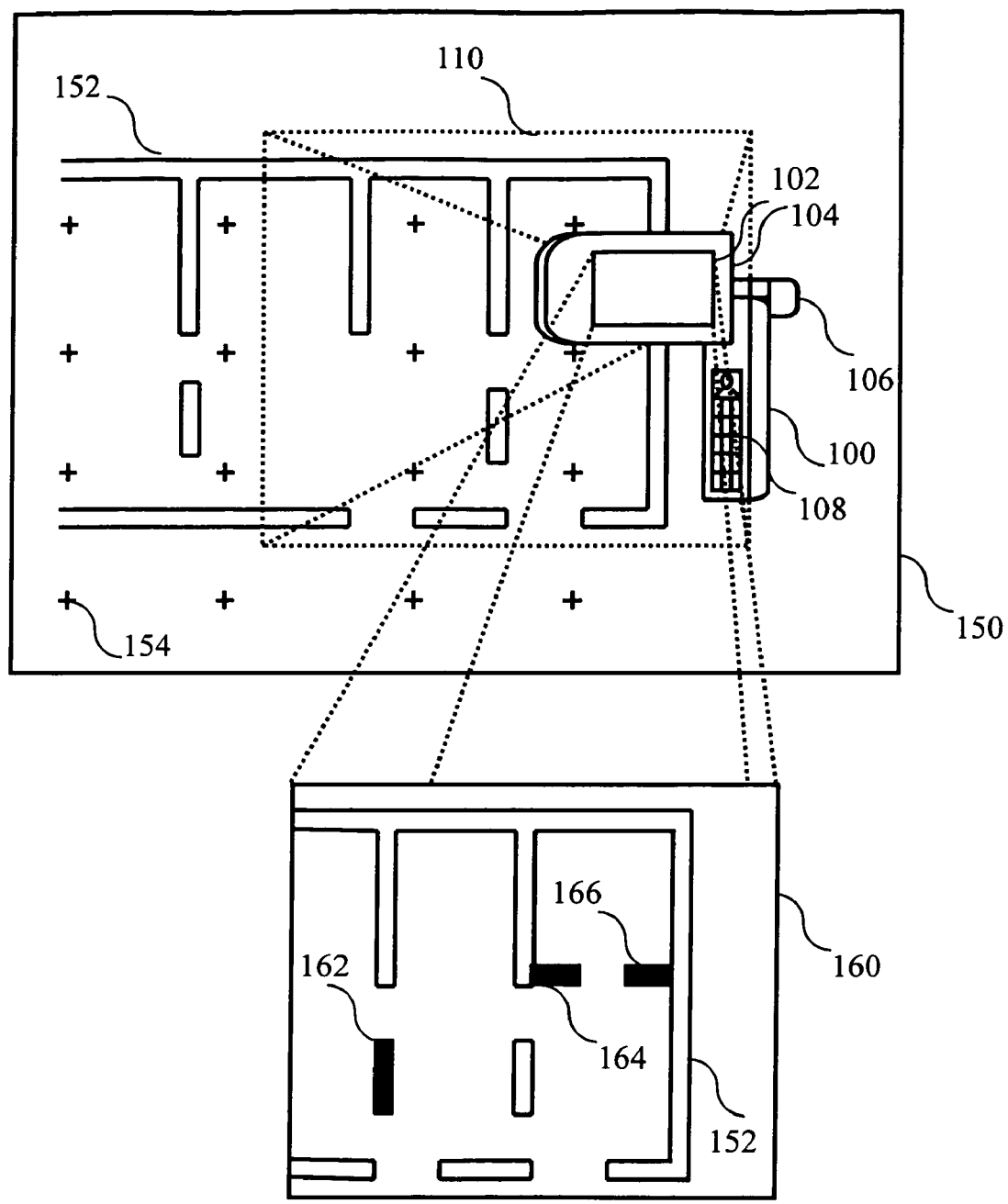
FIG. 1 illustrates from above an electronic device capturing image from a blueprint sheet in one embodiment of the invention.

FIG. 1 illustrates from above an electronic device capturing an image from a blueprint sheet in one embodiment of the invention. In FIG. 1 there is a blueprint sheet 150, which has a drawing 152 printed on it. Drawing 152 represents a part of a ground plan for a building. Blueprint sheet 150 has also uniquely identifiable position markers such as position marker 154, which have been printed on predefined positions on blueprint sheet 150 relative to the edges of blueprint sheet 150. The position markers are similar in general appearance, but have unique visual features that enable them to be identified uniquely on a single sheet. The unique visual features may be machine readable characters indicating, for example, an order number in the horizontal or in the vertical direction, assuming that blueprint sheet 150 is viewed in an upright position. The position markers may be evenly spaced. By measuring the distance of two or more position markers on a captured image 160 of an area 110 of blueprint sheet 150, it is possible to establish the scale of captured image 160 in relation to blueprint sheet 150. By identifying the position markers is possible to determine the position of captured image 160 on blueprint sheet 150. Thus, the positions of the elements of drawing 152 appearing on captured image 160 may be determined relative to the blueprint sheet borders.

In one embodiment of the invention, a coordinate system specific to captured image 160 is established and locations of the elements in drawing 152 may be expressed in terms of this coordinate system. The origin of the coordinate system may, for example, be located at a corner of the camera image.

Distinct pixel sets in captured image 160 may be found to represent more abstract visual geometric forms that have specific types, coordinates and sizes that characterize them. For example, lines with specific starting points, ending points and widths may be detected.

In one embodiment of the invention, at least simplest elements in the image, for example, blocks or areas with uniform texture may be stored in feature encoded format, wherein an element in the image is coded and stored in the memory of the electronic device in terms of a location, the texture and the size of a given geometric form instead of the values of the individual bits belonging to its area. The recognition of forms assists in the merging of existing visual objects to new visual objects drawn by the user. For example, if a new solid box connected to an element known to represent a wall is drawn by the user, the new solid box may be recognized as a new element of the wall.

In FIG. 1 there is also illustrated an electronic device 100. The device is equipped with a keypad 108, display 102, display housing 104 which also acts as a lid for keypad 108 and a camera unit 106. Display housing 104 has been turned 90 degrees around the X-axis in order to enable viewing of blueprint sheet 150 from above. The user (not shown) holds electronic device 100 in her hand over blueprint sheet 150 and views area 110 within it via camera unit 106 and display 102 as captured image 160.

The raw image data from camera unit 106 is provided to electronic device 100. Electronic device 100 detects position markers from the raw image data and determines the coordinates of the captured image 160. At least the coordinates of the captured image 160, which corresponds to area 110, are sent to an object data storage (not shown). From the object data storage is obtained information on the up-to-date visual objects at least partly within area 110 pertaining to the most recent version of drawing 152. The up-to-date visual objects are provided to electronic device 100. Electronic device 100 changes the visual objects in its memory based on the up-to-date visual objects. Electronic device 100 shows the added objects to the user, for example, with a color different from the other objects. The deleted objects may be illustrated with a dotted line or gray color, for example. In FIG. 1 the wall elements 162, 164 and 166 added to drawing 152 are illustrated with black filling.

The user is also provided with an option to make changes to the blueprint sheet 150, for example, with a pen or a special marker so that they are recognized by electronic device 100. In case electronic device 100 detects that there are new visual objects that are not present among the up-to-data visual objects, it furnishes the new visual objects with position information and providers this information to the object data storage. The user may be provided with an option to permit or deny the updating.

If the user accepts, the changes are provided to the object data storage and incorporated therein.

The user may also enter textual comments using keypad 108, which are included among the visual object data and displayed during the course of subsequent viewing sessions. In one embodiment of the invention, the electronic device is equipped with a keyboard, which facilitates the entering of textual comments.

In one embodiment of the invention, information on the current visual objects on captured image 150 are provided to the object data storage, which provides back to electronic device 100 the visual objects changed within a predefined timeframe or a timeframe provided from electronic device 100.

Figure 2:
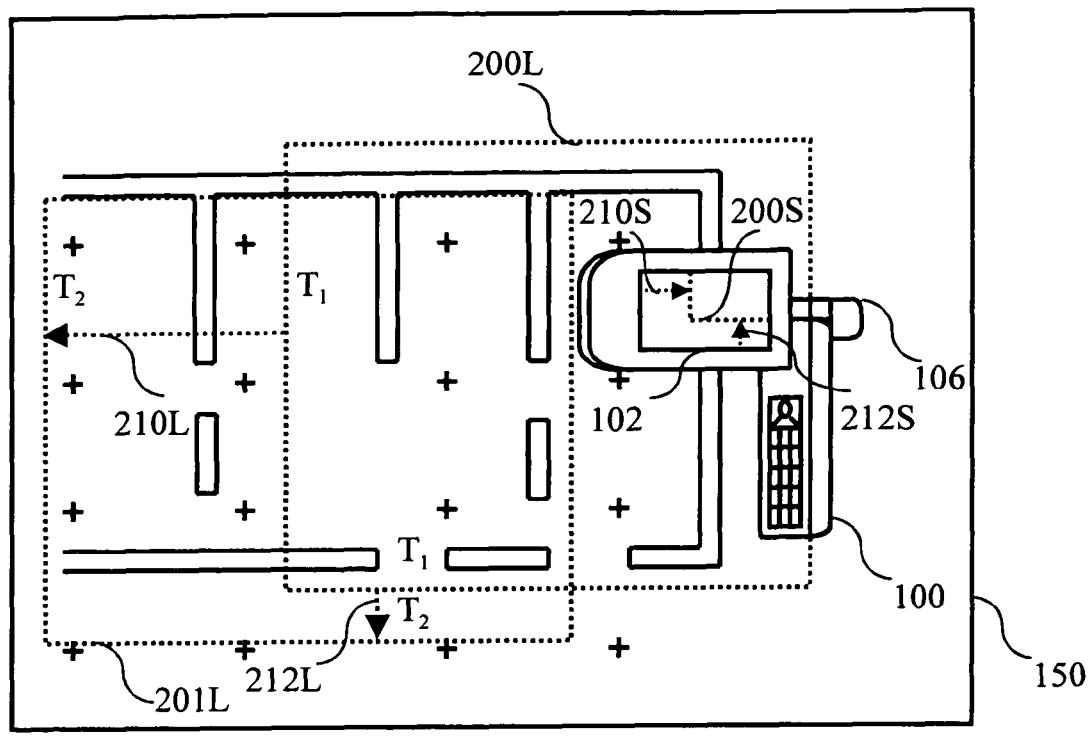
FIG. 2 illustrates the scrolling of display image in correspondence to the moving of the electronic device in one embodiment of the invention.

FIG. 2 is a block diagram illustrating the changing of display image view in correspondence to the moving of the electronic device in one embodiment of the invention.

In FIG. 2 there is an electronic device 100, a camera unit 106 associated with electronic device 100 and a blueprint sheet 150 as illustrated in FIG. 1. In FIG. 2 camera unit 106 captures a series of images of blueprint sheet 150. In one embodiment of the invention, the capturing may be automatic and periodic.

As explained in association with FIG. 1, position markers are used to determine the scale the images in the series in relation to blueprint sheet 150 and to determine the position of each image on blueprint sheet 150. The information on the coordinates of the images captured are sent to an object data storage, which provides in return up-to-date visual objects at least within a buffer area around the frame coordinates provided to it in order to avoid the quick moving of camera outside of the area of retrieved up-to-date visual objects. In any case, it is possible to avoid delays caused by the retrieval of up-to-date visual object data from the object data storage after a possible initial delay.

As electronic device 100 is moved left and downwards and a new image is taken, the boundaries of the previous image still fall partly within the area of the new image. However, the visual object data from the previous image may not be used for simplicity. The image displayed on display 102 corresponds always to the latest image captured. In FIG. 2 there is an area 200L of blueprint sheet 150 which corresponds to an image captured with camera unit 106 at time $T_1$. There is also an area 201L which corresponds to a frame captured with camera unit 106 at time $T_2$. The changes of the areas captured between times $T_1$ and $T_2$ is illustrated with motion vectors 210L and 212L. The corresponding apparent movement of visual objects on display 102 is illustrated with vectors 210S and 212S, even though the display 102 may be completely redrawn between the images. The display area corresponding to the image captured at time $T_1$ seems to be drifting away, as determined with vectors 210S and 212S, is illustrated with box 200S.

In one embodiment of the invention, the rate of images captured is determined based on the rate of the movement of the camera. The movement of the camera may be detected, for example, with an accelerometer or based on the change rate of visual data obtained by camera unit 106.

In one embodiment of the invention, still image, that is, photograph data or video stream data is provided from electronic device 200 to a network server which may perform the conversion of raw visual data to vector format data, the illustration of changes and the capturing of user changes on behalf of electronic device 200. The network server provides a ready-to-display video stream or an image in return to the electronic device.

Figure 3:
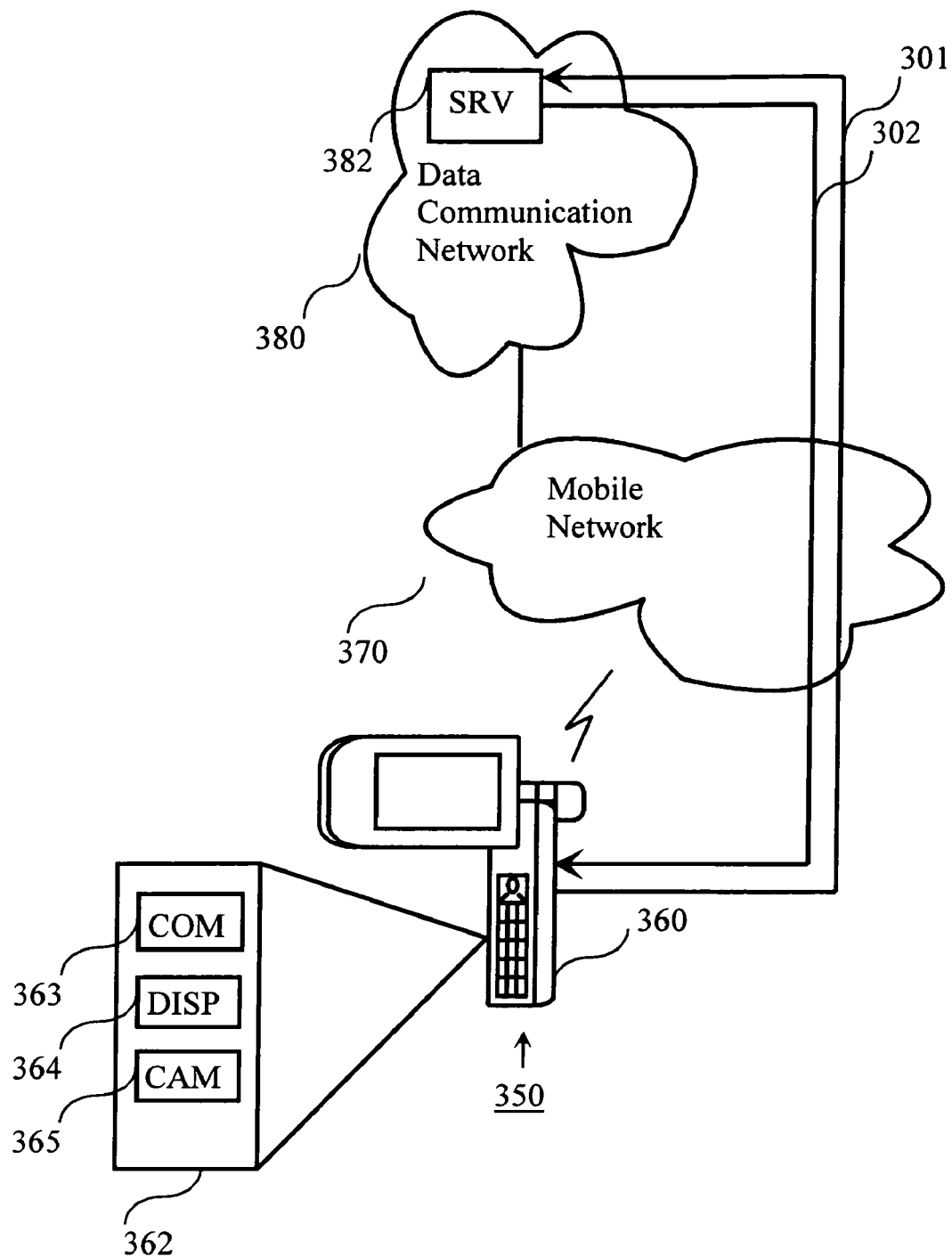
FIG. 3 is a block diagram illustrating the obtaining of blueprint information from a server to an electronic device in one embodiment of the invention.

FIG. 3 is a block diagram illustrating the obtaining of blueprint information from a server to an electronic device in one embodiment of the invention.

In FIG. 3 there is a communication system 350, which comprises a mobile node 360, a mobile network 370 and a Data Communication Network 380. DCN 380 comprises a server 382. DCN 380 may, for example, the Internet, an Intranet, any IP network or any packet switched network. Server 382 may also be a mobile node. The internal functions of mobile node 360 are illustrated with box 362. Mobile node 360 comprises a camera 361, a communication entity 363, a display entity 364 and a visual processing entity 365. Mobile node 360 captures image data using camera 361. The image data is converted to vector form. The position information of the image on a blueprint sheet (not shown) is determined. As illustrated with arrow 301, mobile node 360 provides the position information to server 382. Server 382 responds back with the up-to-date visual object information pertaining to position information and a surrounding area. If video is captured with camera 361 instead of still image, a larger buffer area around the position indicated is provided to mobile node 360.

In one embodiment of the invention, there may be a direct connection between mobile node 360 and server 382. In one embodiment of the invention, the connection between mobile node 360 and server 382 may comprise a first connection segment from mobile node 360 to an intermediate computer and a second connection segment from the intermediate computer to server 382. The first connection segment may comprise a short-range or an infrared connection.

Figure 4:
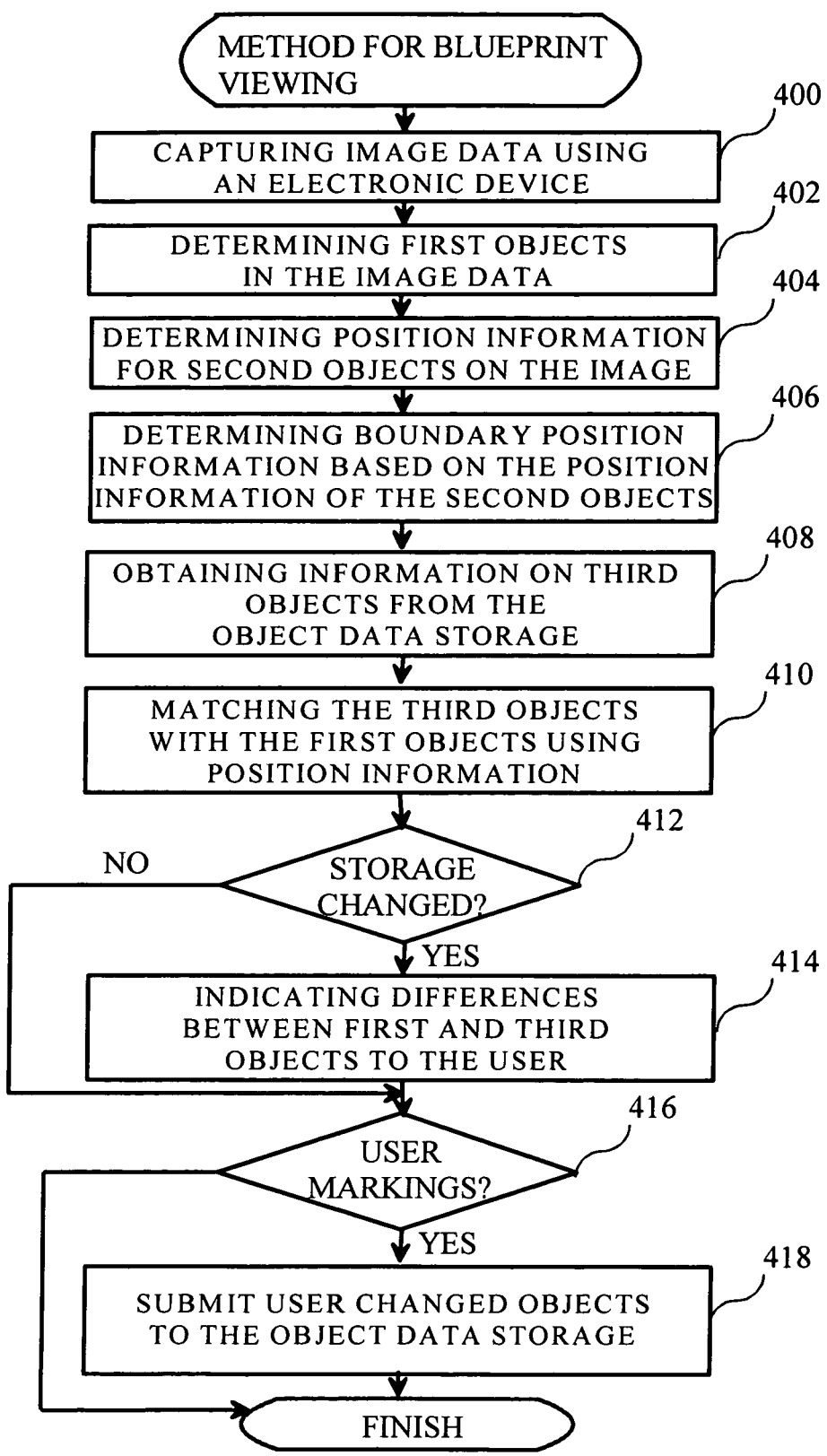
FIG. 4 is a flow chart illustrating a method for the viewing of blueprints in one embodiment of the invention.

FIG. 4 is a flow chart illustrating a method for secure program execution in one embodiment of the invention.

At step 400, image data is captured using an electronic device. The electronic device may, for example, be a mobile phone with a video and/or still camera. The image data may be a bitmap, a coded picture or a video stream. The image data may capture a part of a blueprint sheet.

In one embodiment of the invention the image data is provided from an electronic device to a network server in bitmap, coded picture or video stream format and the subsequent image processing steps are performed on the server.

At step 402, first objects are determined in the image data. The first objects may comprise all explicitly detected visual objects.

At step 404, position information for second objects among the first objects is determined. The second objects may be position markers indicating a specific location on a blueprint sheet. The position markers have visually coded information associated with them that enable the position of any given marker on the blueprint sheet to be determined.

In one embodiment of the invention, second visual objects may be invisible to the human eye, that is, they are only detectable for an electronic eye. For example, a second visual object may be an infrared led, for example, a printed infrared led.

At step 406, image boundary position information is determined based on the position information of the second objects. By measuring the distance of two or more position markers on a captured image, it is possible to establish the scale of captured image in relation to the physical entity, that is, the blueprint sheet. By identifying the positions of the markers on the captured image is possible to determine the position of captured image on blueprint sheet. Further, from the positions of the markers, their relative distances and their distances to the borders of the captured image, it is possible to determine the positions of the corners of the captured image. Similarly, the position of any given visual object may be determined.

The position of a corner is provided to object data storage in order to obtain information on at least one third object. The position may be accompanied with information on the resolution of the electronic device.

In one embodiment of the invention, the position information may be translated to a different, coarser, coordinate system, which may be used by the object data storage and may be used in the further visual processing.

In one embodiment of the invention, the object data storage is kept on the server which receives the image data in one embodiment of the invention.

At step 408, information on third objects is obtained from the object data storage. The third objects may be provided to the electronic device. The third objects may represent up-to-date visual object data.

At step 410, the information on the third objects is matched with information on the first objects. The matching uses object position information. The position information for first objects is determined by using their position in relation to the second objects.

At step 412, it is checked if the third objects have changed information in relation to the information on first objects. If there are changes, the method continues at step 414. If there are no changes, the method continues at step 416.

In one embodiment of the invention, the user markings on the blueprint sheet are distinguished from original printing with the use of a different color. In one embodiment of the invention, the user markings are detected based on a narrower and non-uniform line style.

At step 414, the differences between the first and the third objects are indicated to the user. The new visual objects may be indicated with a different color or by highlighting them.

In one embodiment of the invention, the indication is provided from a network server to the electronic device in a picture or video stream format.

At step 416, it is detected whether there are any user markings on the blueprint sheet to be incorporated to the object data storage. If there are user markings, the method continues at step 418. Otherwise the user is allowed to view the blueprints via the display of the electronic device and the method is finished.

At step 418, information on the user changed visual objects is submitted to the object data storage.

In one embodiment of the invention, the user is prompted for permission to submit the user changed visual objects to the object data storage.

Figure 5:
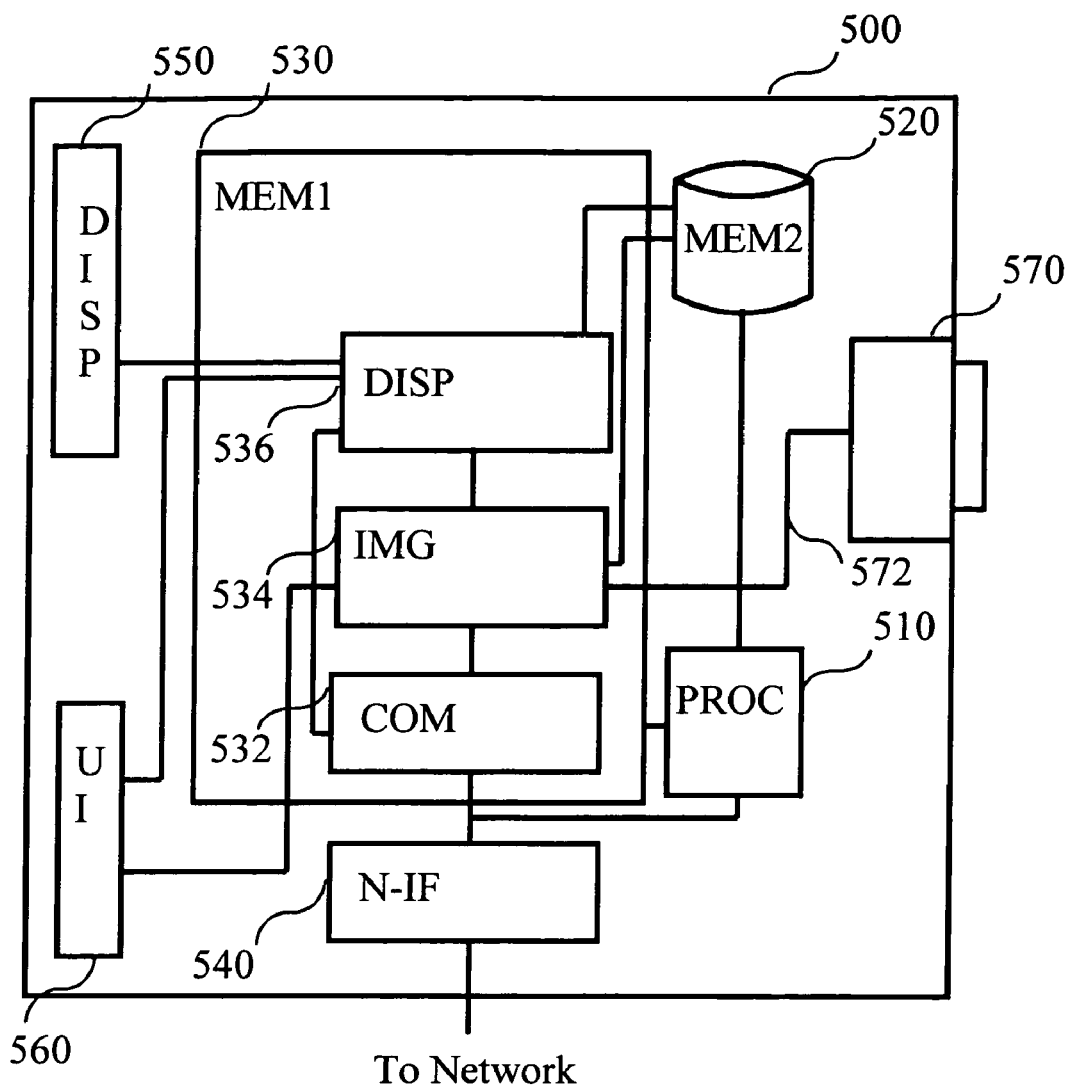
FIG. 5 is a block diagram illustrating an electronic device in one embodiment of the invention.

FIG. 5 is a block diagram illustrating a network node in one embodiment of the invention.

In FIG. 5 there is illustrated an electronic device 500. Electronic device 500 comprises a processor 510, a secondary memory 520, a primary memory 530, a display 550, a user interface 560 and a camera unit 570. Electronic device 500 may also comprise any number of other processors and any number secondary memory units. There may also be other primary memories with separate address spaces. Electronic device 500 comprises also a network interface 540. Network interface may, for example, be a cellular radio interface, a Wireless Local Area Network (WLAN) interface, a local area network interface or a wide area network interface. Processor 510 executes a number of software entities stored at least partly in primary memory 530. Primary memory 530 comprises a communication entity 532, an image processing entity 534 and a display entity 536. Image processing entity 534, which communicates with camera unit 570, may perform the conversion between vector format and raw video or picture format. Image processing entity 534 is also configured to detect changes in the vector format or raw data format and to indicate the changes to the user via display entity 536. Display entity 536 controls display 550 to display to the user the augmented blueprint data. Camera unit 570 comprises a connection for providing image data to primary memory 530. The image data may be provided in bitmap or picture coded format. Communication entity 532 communicates with remote network nodes for enabling them to communicate with other entities within electronic device 500. Communication entity 532 comprises, for example, the Internet Protocol (IP) protocol stack.

In one embodiment of the invention, image processing entity 534 is configured to determine at least one first visual object in the image data, to determine at least one second visual object among said at least one first visual object, to determine position information for said at least one second visual object within said physical entity, to obtain at least one third visual object based on said position information from an object data storage, to match the at least one third visual object with the at least one first visual object and to produce information for indicating differences between said at least one third visual object and said at least one first visual object.

Figure 6:
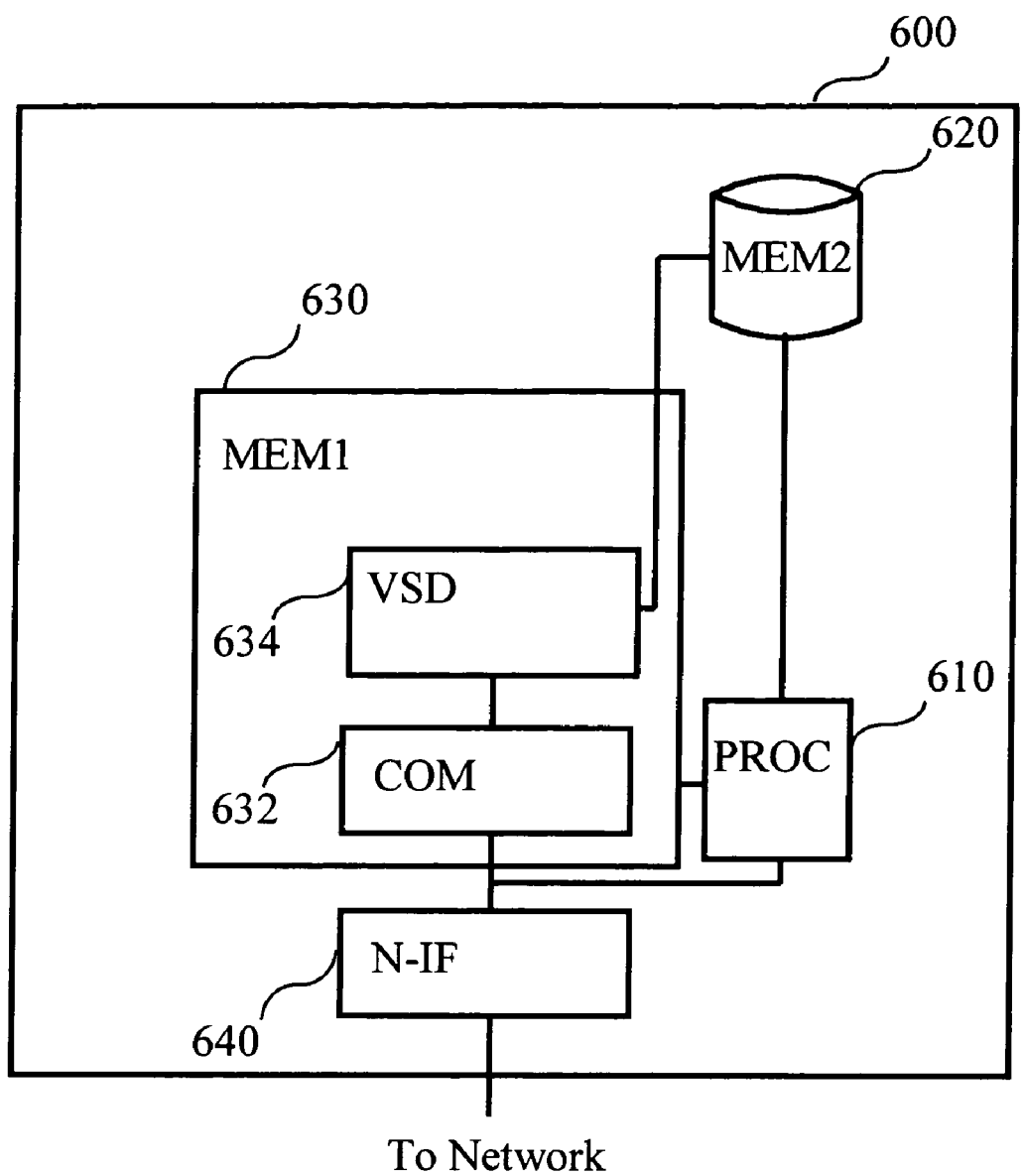
FIG. 6 is a block diagram illustrating an electronic device in one embodiment of the invention.

FIG. 6 is a block diagram illustrating a network node in one embodiment of the invention.

In FIG. 6 there is illustrated a network node 600. Network node 600 comprises a processor 610, a secondary memory 620 and a primary memory 630. Network node 600 may also comprise any number of other processors and any number secondary memory units. There may also be other primary memories with separate address spaces. Network node 600 comprises also a network interface 640. Network interface may, for example, be a cellular radio interface, a Wireless Local Area Network (WLAN) interface, a local area network interface or a wide area network interface. Processor 610 executes a number of software entities stored at least partly in primary memory 630. Primary memory 630 comprises a communication entity 632 and a visual data processing entity 634. Visual data processing entity 634 receives video stream or picture data over the network from an electronic device and may perform the conversion between raw video or image format and vector format. Visual data processing entity 634 also provides an augmented video stream to the electronic device so that changes to blueprints are visible to the user.

The entities within electronic device 500 such as communication entity 532, image processing entity 534 and display entity 536 may be implemented in a variety of ways. Similarly, the entities within network node 600 such as communication entity 632 and visual data processing entity 634 may be implemented in a variety of ways. They may be implemented as processes executed under the native operating system of the network node or the electronic device. The entities may be implemented as separate processes or threads or so that a number of different entities are implemented by means of one process or thread. A process or a thread may be the instance of a program block comprising a number of routines, that is, for example, procedures and functions. The entities may be implemented as separate computer programs or as a single computer program comprising several routines or functions implementing the entities. The program blocks are stored on at least one computer readable medium such as, for example, a memory circuit, a memory card, a holographic memory, magnetic or optic disk. Some entities may be implemented as program modules linked to another entity. The entities in FIGS. 5 and 6 may also be stored in separate memories and executed by separate processors, which communicate, for example, via a message bus or an internal network within the network node or the electronic device. An example of such a message bus is the Peripheral Component Interconnect (PCI) bus. The internal network may be, for example, a local area network. The entities may also be partly or entirely implemented as hardware, such as ASICS or FPGAs.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method comprising:
   capturing image data of a physical entity using a mobile communication device, the physical entity including a blueprint sheet;
   determining at least one first visual object in the image data;
   determining at least one second visual object among said at least one first visual object;
   determining at least one first position for the at least one second visual object within said physical entity;
   determining at least one second position based on said at least one first position;
   obtaining at least one third visual object based on said at least one second position from an object data storage;
   matching the at least one third visual object with the at least one first visual object; and
   indicating differences between said at least one third visual object and said at least one first visual object to a user, the differences including one or more changes made to the blueprint sheet with a physical marker recognizable by the mobile communication device.

2. The method according to claim 1, the method further comprising: determining at least one change to the physical entity;
   determining at least one fourth visual object based on the at least one change; and
   providing said at least one fourth visual object to said object data storage.

3. The method according to claim 1, the method further comprising:
   determining position for said at least one first visual object using said at least one second position; and
   matching a position of one of said at least one third visual object with the position of one of said at least one first visual object to determine if the first visual object and the third visual object represent a same visual object.

4. The method according to claim 1, wherein the at least one second visual object has associated with it visual information indicating a position of said second visual object relative to boundaries of said physical entity.

5. The method according to claim 1, wherein said physical entity comprises an architectural blueprint sheet.

6. The method according to claim 1, wherein said image data comprises at least one of still picture and video stream.

7. The method according to claim 1, further comprising:
   determining a rate of images captured by the mobile communication device based, at least in part, on a rate of the movement of the mobile communication device.

8. The method according to claim 7, further comprising:
   detecting the movement of the mobile communication device with an accelerometer, or based on a change rate of the differences, or a combination thereof.

9. A mobile communication device comprising:
   a camera configured to capture image data of a physical entity, the physical entity including a blueprint sheet;
   a processor configured to determine at least one first visual object in the image data, to determine at least one second visual object among said at least one first visual object, to determine at least one first position for the at least one second visual object within said physical entity, to determine at least one second position based on said at least one first position, to obtain at least one third visual object based on said at least one second position from an object data storage, to match the at least one third visual object with the at least one first visual object, to produce information to indicate differences between said at least one third visual object and said at least one first visual object, the differences including one or more changes made to the blueprint sheet with a physical marker recognizable by the mobile communication device; and
   a display.

10. A mobile network communication node comprising:
    a camera configured to capture image data of a physical entity, the physical entity including a blueprint sheet;
    a communication entity configured to receive image data of a physical entity and to transmit augmented visual data; and
    a visual data processing entity configured to determine at least one first visual object in the image data, to determine at least one second visual object among said at least one first visual object, to determine position information for said at least one second visual object within said physical entity, to determine-second position information based on said position information, to obtain at least one third visual object based on said second position information from an object data storage, to match the at least one third visual object with the at least one first visual object and to produce the augmented visual data indicating differences between said at least one third visual object and said at least one first visual object to a user, the differences including one or more changes made to the blueprint sheet with a physical marker recognizable by the mobile communication device.

11. A mobile network communication node comprising:
means for capturing image data of a physical entity, the physical entity including a blueprint sheet;
means for transmitting augmented visual data;
means for determining at least one first visual object in the image data;
means for determining at least one second visual object among said at least one first visual object;
means for determining position information for said at least one second visual object within said physical entity;
means for determining second position information based on said position information;
means for obtaining at least one third visual object based on said second position information from an object data storage;
means for matching the at least one third visual object with the at least one first visual object; and
means for producing the augmented visual data indicating differences between said at least one third visual object and said at least one first visual object to a user, the differences including one or more changes made to the blueprint sheet with a physical marker recognizable by the mobile communication device.

12. A non-transitory computer readable storage medium carrying one or more sequences of one or more instructions which, when executed by one or more processors, cause an apparatus to at least perform the following steps:
capturing image data of a physical entity using a mobile communication device, the physical entity including a blueprint sheet;
determining at least one first visual object in the image data;
determining at least one second visual object among said at least one first visual object;
determining at least one first position for at least one second visual object within said physical entity;
determining at least one second position based on said at least one first position;
obtaining at least one third visual object based on said at least one second position from an object data storage;
matching the at least one third visual object with the at least one first visual object; and
indicating differences between said at least one third visual object and said at least one first visual object to a user, the differences including one or more changes made to the blueprint sheet with a physical marker recognizable by the mobile communication device.

13. The computer readable storage medium according to claim 12, wherein said computer readable storage medium is a removable memory card, a magnetic disk, an optical disk, a holographic memory, or a combination thereof.

14. An apparatus comprising:
at least one processor; and
at least one memory including computer program code for one or more programs,
the at least one memory and the computer program code configured to, with the at least one processor, cause the apparatus included in a mobile communication device to perform at least the following,
cause, at least in part, the mobile communication device to capture image data of a physical entity, the physical entity including a blueprint sheet;
determine at least one first visual object in the image data;
determine at least one second visual object among said at least one first visual object;
determine at least one first position for the at least one second visual object within said physical entity;
determine at least one second position based on said at least one first position;
obtain at least one third visual object based on said at least one second position from an object data storage;
match the at least one third visual object with the at least one first visual object; and
produce information for indicating differences between said at least one third visual object and said at least one first visual object, the differences including one or more changes made to the blueprint sheet with a physical marker recognizable by the mobile communication device.

15. The apparatus according to claim 14, wherein the apparatus is further caused to determine at least one change to the physical entity, to determine at least one fourth visual object based on the at least one change and to provide said at least one fourth visual object to said object data storage.

16. The apparatus according to claim 14, wherein the apparatus is further caused to determine position for said at least one first visual object using said at least one second position and to match a position of one of said at least one third visual object with the position of one of said at least one first visual object to determine if the first visual object and the third visual object represent a same visual object.

17. The apparatus according to claim 14, wherein the apparatus is further caused to detect visual information associated with the at least one second visual object, the visual information indicating the position of said at least one second visual object relative to boundaries of said physical entity.

18. The apparatus according to claim 14, wherein said image data comprises at least one of still picture and video stream.

* * * * *